Feb. 28, 1956
E. A. HOFFMANN
2,736,601
GENERATOR LIFTING TONGS
Filed June 19, 1953
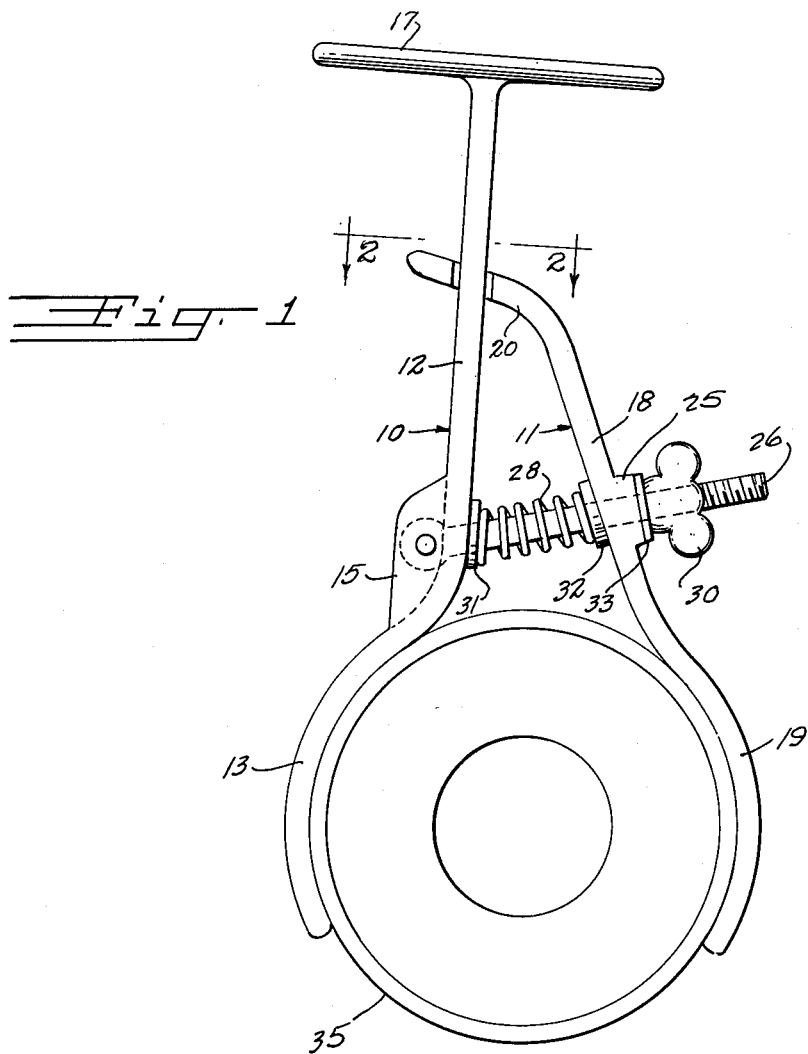
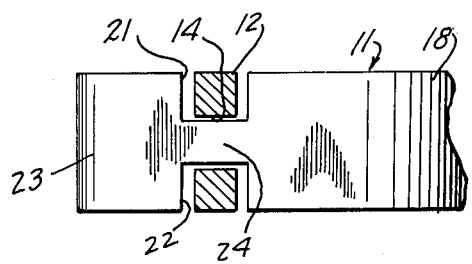
INVENTOR.
Erwin A. Hoffmann,
BY
McMorrow, Berman + Davidson
ATTORNEYS

United States Patent Office 2,736,601
Patented Feb. 28, 1956

2,736,601

GENERATOR LIFTING TONGS

Erwin A. Hoffmann, Waskish, Minn.

Application June 19, 1953, Serial No. 362,726

1 Claim. (Cl. 294—104)

This invention relates to tongs for handling small electric motors or generators, such as the generators or starting motors of automotive vehicles, and more particularly to a tong which can be clamped onto an automotive vehicle generator to provide a handle projecting from and rigidly connected to the generator.

It is among the objects of the invention to provide a generator tong which can be easily clamped onto an automotive vehicle electrical generator to provide a handle rigidly connected to and projecting from the generator for handling the generator while it is separated from the associated vehicle engine and while the generator is being removed from or connected to an engine; which will fit generators of different sizes and may also be used in some cases for handling engine starting motors; and which is simple and durable in construction, economical to manufacture, easy to use, and effective and efficient in use.

Other objects and advantages will become apparent from a consideration of the following description and the appended claim in conjunction with the accompanying drawing wherein:

Figure 1 is a side elevational view of a generator tong illustrative of the invention shown in operative engagement with an automotive vehicle generator; and Figure 2 is a fragmentary cross sectional view on the line 2—2 of Figure 1.

With continued reference to the drawing, the tong comprises a pair of bars, generally indicated at 10 and 11 pivotally connected together and disposed in side by side relationship to provide a pair of tongs. The bar 10 includes a substantially straight shank portion 12 and a longitudinally curved jaw 13 extending through substantially less than 180° from one end of the shank portion and angularly offset therefrom. A closed slot 14 extends longitudinally and medially of the width of the shank portion 12 intermediate the length of this shank portion and an apertured lug formation 15 is provided on the side of the shank portion 12 at the convex side of the jaw 13, an aperture being provided in the shank portion at the location of this lug formation.

A cross bar 17 is mounted intermediate its length on the end of the shank 12 remote from the jaw 13 and is disposed substantially perpendicular to the shank to provide a handle for the tong.

The bar 11 has a substantially straight intermediate portion 18, a longitudinally curved jaw 19 extending from one end of the intermediate portion 18 through substantially less than 180° and an angularly offset end portion 20 at the other end of and disposed at an obtuse angle to the intermediate portion. The angularly offset portion is provided with transversely aligned notches 21 and 22 disposed in respectively opposite sides of the angularly offset portion and near the distal end thereof to provide a T-head formation 23 on this end of the bar 11. The T-head 23 is inserted through the slot 14 in the shank 12 and then rotated so that the neck 24 of the T-head formation extends through the slot and the formation provides a pivotal connection between the bar 11 and the bar 10 at one end of the bar 11 and intermediate the length of the bar 10.

Adjacent the proximal end of the jaw 19 the bar 11 is provided with an apertured boss 25 and a screw shaft 26 is pivotally connected at one end to the lug formation 15 and extends through the aperture in the bar 10 and through the apertured boss 25 of the bar 11, the portion of this screw shaft extending through the boss 25 being externally screw threaded. A coiled compression spring 28 surrounds the screw shaft 26 between the bars 10 and 11 and resiliently urges the jaws 13 and 19 away from each other and a wing nut 30 is threaded onto the screw shaft at the outer side of the bar 11 and is effective to force the jaws 13 and 19 toward each other against the force of the spring 28. Preferably abutment washers 31 and 32 receive the shaft 26 between the inner sides of the bars 10 and 11 and the adjacent ends of the spring 28 and a thrust washer 33 receives the shaft 26 between the outer end of the boss 25 and the adjacent end of the wing nut 30.

The jaws 13 and 19 are concavely opposed to each other and are longitudinally curved on a radius of curvature substantially the same as the radius of curvature of the substantially cylindrical body or housing of an automotive vehicle electrical generator, as indicated at 35, disposed between the jaws. Portions 12, 18 are at an acute angle to each other, jaw 13 being wholly outside said angle and jaw 19 having a major part of its length outside the angle.

In order to engage the tong with a generator, with the nut 30 threaded outwardly along the screw shaft 26 and the spring 28 holding the jaws 13 and 19 apart so that the distal ends of these jaws will pass diametrically opposite portions of a generator housing, the tong is so positioned that the generator housing is disposed between the concave sides of the tong jaws 13 and 19 and the wing nut 30 is then threaded inwardly along the shaft 26 clamping the jaws firmly about the generator housing and rigidly connecting the tong to the generator in position such that the shank 12 projects substantially radially outwardly of the generator housing and carries the handle 17 at its outer end. With the tong so clamped on the generator a handle is provided for the generator by means of which the generator can be handled and can be held in proper position by one hand of a mechanic while the mechanic uses his other hand to manipulate the fastenings by which the generator is mounted on an associated engine to remove the generator from or remount it on an engine. Obviously, the tong may be used in a similar manner to handle engine starting motors of substantially the same size and shape as the engine mounted generators.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A generator tongs comprising: a first bar including an elongated, straight shank portion, a longitudinally curbed jaw extending from one end of the shank portion, and a handle mounted intermediate its ends to the other end of the shank portion, said shank portion having intermediate its ends a closed slot extending longitudinally and centrally thereof; a second bar including a substantially straight intermediate portion disposed at an acute angle to said shank portion, a longitudinally curved jaw extending from one end of said intermediate portion, said jaws being concavely opposed for gripping a cylindrical object therebetween, each jaw extending through substantially less than 180° of a circle, the first jaw being disposed wholly outside the acute angle defined between said portions and the second jaw having at least a major part of its length outside said angle, and an end portion on the second bar obtusely related to and rigid with the other end of said intermediate portion, said end portion being loosely and pivotally engaged in said slot; a shaft pivotally connected at one end to said first bar between the first named jaw and said slot and extending between the bars, the intermediate portion of the second bar having an opening receiving the shaft, said shaft being threaded at its other end; a nut threaded upon said other end of the shaft and bearing against the second bar to shift the bars toward each other responsive to threading of the nut toward the first named end of the shaft; and spring means circumposed about the shaft and held under compression between the bars to resiliently and yieldably urge the bars away from each other.

References Cited in the file of this patent
UNITED STATES PATENTS

| | | |
|---|---|---|
| 456,189 | Arnot | July 21, 1891 |
| 499,933 | Phillips | June 20, 1893 |
| 1,472,556 | Dallas | Oct. 30, 1923 |
| 1,910,725 | Valenta | May 23, 1933 |
| 2,662,432 | Peitl | Dec. 15, 1953 |